April 28, 1964   W. A. PREUSS   3,130,485
APPARATUS FOR EXTRACTING TUBE MOUNTS FROM ASSEMBLY JIGS
Filed Sept. 18, 1961   2 Sheets-Sheet 1

INVENTOR.
WALTER A. PREUSS
BY William A. Zalesak
ATTORNEY

April 28, 1964   W. A. PREUSS   3,130,485
APPARATUS FOR EXTRACTING TUBE MOUNTS FROM ASSEMBLY JIGS
Filed Sept. 18, 1961   2 Sheets-Sheet 2
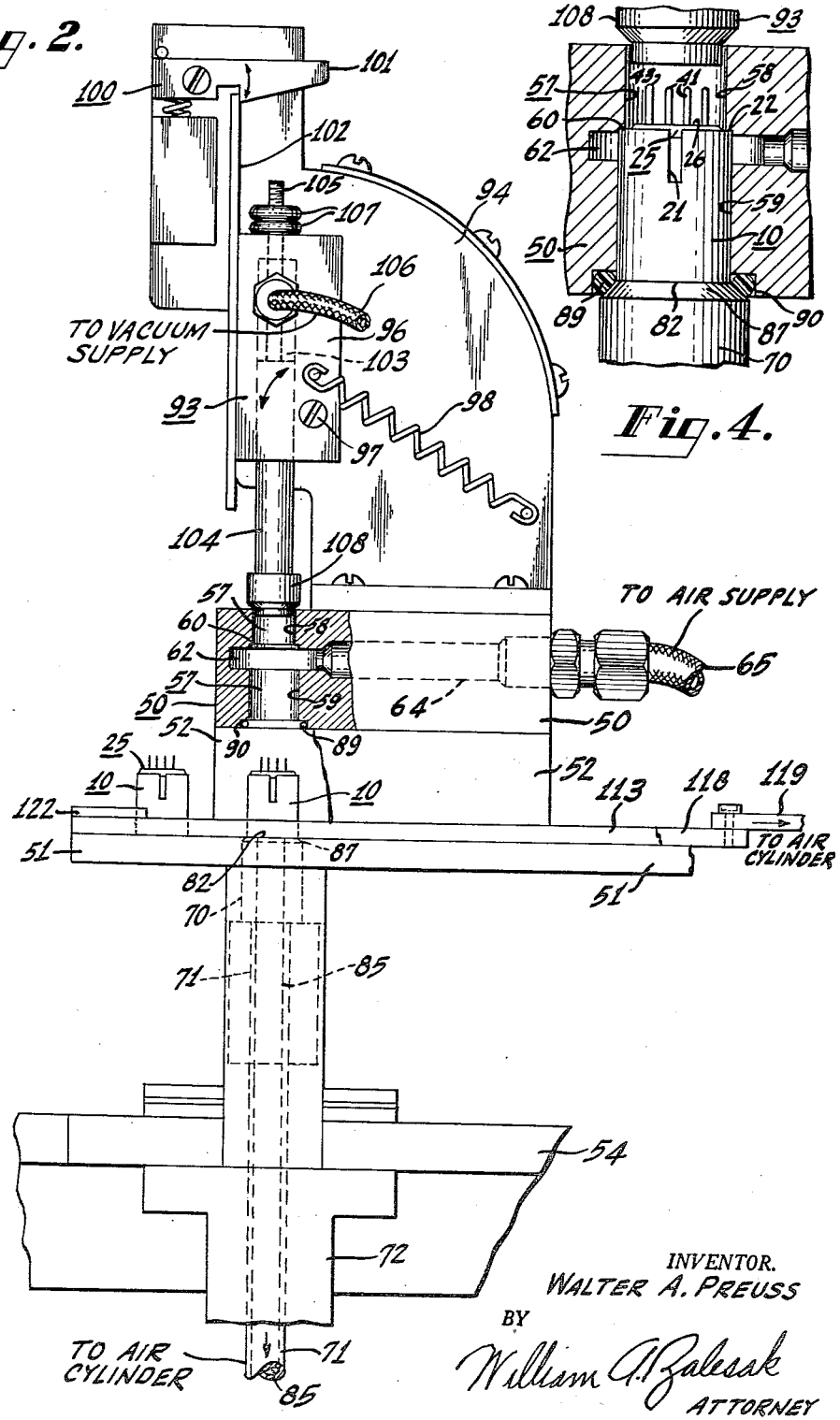
INVENTOR.
WALTER A. PREUSS
BY
William A. Zalesak
ATTORNEY United States Patent Office 3,130,485
Patented Apr. 28, 1964

3,130,485
APPARATUS FOR EXTRACTING TUBE MOUNTS
FROM ASSEMBLY JIGS
Walter A. Preuss, West Orange, N.J., assignor to Radio
Corporation of America, a corporation of Delaware
Filed Sept. 18, 1961, Ser. No. 138,670
13 Claims. (Cl. 29—203)

This invention relates to apparatus used in the fabrication of electron tubes and more particularly to an apparatus for extracting electron tube mounts from assembly and brazing jigs.

In the fabrication of one type of electron tube hereinafter described, it is the practice to assemble the tube electrodes and electrode supports in an assembly jig and to braze the parts together to form a unitary mount assembly. The jig is provided with a plurality of elongated concentric cylinders adapted to receive successively, in vertical position, tubular elements including a support and electrodes in suitably spaced relation. The tubular elements engage the jigging cylinders in snug relation to provide the necessary close dimensional control of the spacing between the elements. Thereafter, electrode supports, or flanges, are loaded onto the ends of the electrodes and perpendicularly thereto. The flanges can also be loaded simultaneously with their associated tubular support and electrodes. A ceramic wafer is loaded into the jig and in engagement with a shoulder provided adjacent the wall thereof, the wafer being positioned in concentric axially spaced relation with the ends of the electrodes and parallel to the flanges. A number of support and conductor rods are assembled in the openings in the wafer extended into contact with each of the flanges, several spaced apart rods being provided for each flange. Brazing material is provided on the tube parts and the loaded jig is placed in an oven to braze the parts together.

One problem associated with this method of fabrication is that after brazing it is often very difficult to remove the brazed mounts or mount assemblies from the jig without distorting the electrodes. One reason for this problem is that although the flanges and wafer are loaded into the jig in parallel relationship, some tilting of the flanges or the wafer may occur whereby the parallel relationship is lost. The effect of this is that the lengths of the several rods extending between the wafer and into contact with each of the flanges are unequal. Upon heating, the rods of different length expand different amounts, and after hardening of the brazing material and subsequent cooling, the rods contract different amounts. Prior to complete cooling, the flanges are rigidly fixed to the ends of the electrodes and the rods fixed to the wafer and flanges. Since the wafer is also held snugly in position by the jig shoulder or seat, the different amounts of rod thermal contractions induce stresses between the flanges and the rods and between the rods and the wafer. Such stresses cause tilting of the wafer which results in a binding or jamming of the wafer against the jig wall. Although the amount of force required to free the wafer from the jig is not excessive, nevertheless, the mechanical means employed in the prior art were not capable of applying the necessary force to the tilted and jammed wafer in such fashion as to remove the mount from the jig without tilting it with respect to the longitudinal axis of the jig. Such tilting of the mount or mount assembly during its removal from the jig causes the mount or mount assembly electrodes to be dragged against the jigging cylinders, thereby damaging the electrodes and destroying the critical electrode alignment.

It is therefore an object of this invention to provide apparatus for extracting electron tube mounts from assembly jigs.

Particularly, it is an object of this invention to provide apparatus for removing electron tube mounts from assembly and brazing jigs without dragging of the mount electrodes against the jigging cylinders thereby avoiding mount distortion.

As will be described hereinafter, the assembly and brazing jig may be cup-shaped with the mount assembly disposed therein so that the mount wafer substantially closes the open top end of the jig. For removing the brazed mount from the jig in accordance with this invention, apparatus is provided comprising a housing having a tubular chamber therein adapted to receive a loaded brazing jig through one end of the chamber. Means are provided for sealing the chamber, the wafer serving as a part of the sealing means. A hole is provided in the wall of the jig and means are provided for blowing air into the chamber and into the jig. When the air pressure within the jig increases to a sufficient amount, the mount is blown out of the jig and out of the chamber. As will be described, the air exerts a uniform force against the wafer whereby the mount is lifted from the jig substantially parallel to the longitudinal axis of the jig. Positioned adjacent an end of the chamber is a means for receiving and holding the mount after it is blown from the jig. In order to prevent excessive jarring of the mount and possible changes in the critical electrode spacings and alignment, the mount receiving means is yieldingly mounted for absorbing the shock from the impact of the mount therewith. Further features of the invention will become apparent as the description thereof proceeds in connection with the attached drawing wherein:

FIG. 3 is a partial plan view with parts removed of the apparatus shown in FIG. 2; and FIG. 4 is a fragmentary view on an enlarged scale of a portion of the apparatus of FIG. 2 but at a later step in the mount removal cycle and showing the mount removal chamber with a jig contained therein.

Figure 1:
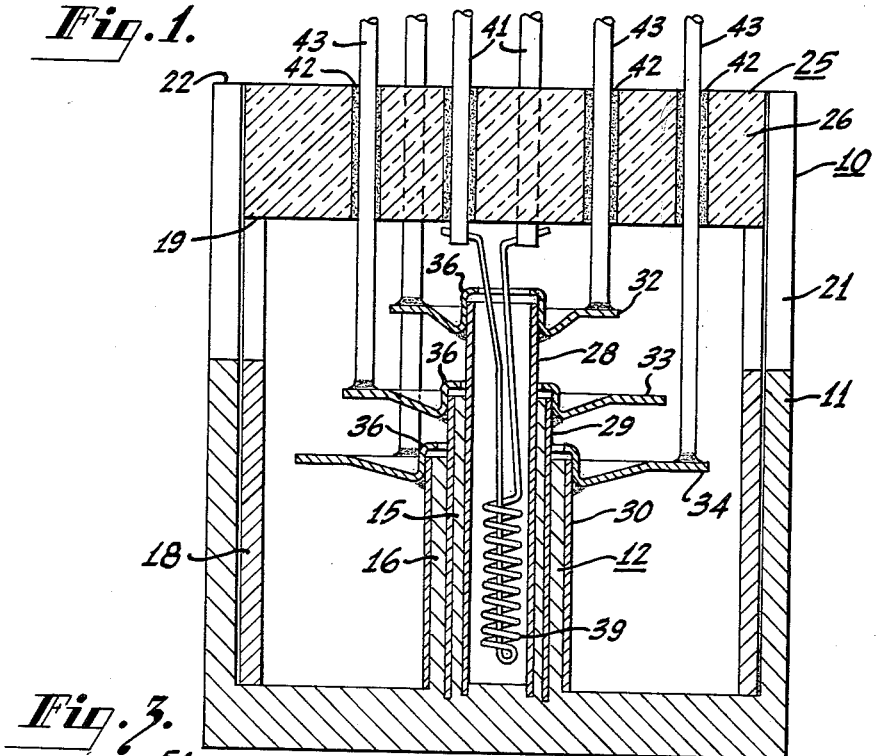
FIG. 1 is a longiutdinal section of a brazing tube containing a brazed mount assembly.

FIG. 1 shows a loaded assembly and brazing jig 10 of a type which may be operated on by the apparatus of this invention. The jig comprises a hollow cup-shaped housing 11 having a centrally disposed jigging assembly 12 therein including two concentric jigging cylinders 15 and 16. A tubular insert 18 is also included within housing 11, the upper end of the insert 18 providing an annular ledge or shoulder 19 for receiving and positioning the wafer 26 of a mount assembly 25. The side wall of housing 11 is provided with a number of slots 21 therethrough which extend downwardly from the top open end 22 of the jig.

During assembly of a tube mount or mount assembly 25 within jig 10, the tubular electrode support 28 and electrodes 29 and 30, are first dropped into the jig and into engagement with the jigging cylinders 15 and 16. The tubular electrodes fit snugly around or within the jigging cylinders in order to provide the desired electrode spacings and alignment. Thereafter, flanges 32, 33 and 34 are dropped into the jig and onto the ends of the electrodes 28, 29 and 30 respectively, centrally disposed tubular portions 36 on each of the flanges being disposed about the ends of the electrodes. The tubular portions fit snugly about the electrode ends, the flanges being supported solely by the electrodes. A ceramic header wafer 26 is inserted into jig 10 and fitted in proper axial and concentric spacing with respect to the electrodes and flanges by engagement of wafer 26 with shoulder 19 and the inside of the jig wall. The spacing of wafer 26 with respect to the other tube parts is relatively critical, hence the wafer must fit snugly within the jig. Prior to assembly of the wafer 26 into jig 10, a heater 39 has been secured to two conductors 41 extending through bores 42 of the ceramic wafer. The heater 39 is inserted within electrode 28 when the wafer is placed within the jig. A plurality of conductors 43 may then be dropped through bores 42 in wafer 26 and into engagement with each flange. Three conductors 43 may engage each flange, the conductors being spaced 120° apart.

For brazing the tube parts together, brazing material may be provided as a coating on some of the tube parts and as separate rings loaded into the jig during assembly of the mount. The loaded jig is then inserted into a hydrogen furnace wherein the brazing material melts and flows to provide brazed joints between the tube parts.

As mentioned, one problem associated with this method of assembly is that it is often very difficult to remove the brazed tube mount or mount assembly 25 from the jig 10 without damaging the mount or mount assembly electrodes. The reason for this difficulty is that the three conductors 43 extending between wafer 26 and a flange 32, 33 or 34, will be of different lengths if the flange and wafer are not perfectly parallel to one another. That is, although the flanges are loaded onto the ends of the electrodes in perpendicular relation therewith, the flanges may become tilted upon handling of the jig prior to brazing. During brazing, and prior to complete cooling of the jigs, the conductors 43 are brazed and rigidly secured to the flanges and to the walls of bores 42 of wafer 26, and the flanges brazed to the electrodes. Upon cooling, the conductors of different lengths tend to contract different amounts. Because the electrodes and wafer are held firmly in place by the jigging elements, the varying conductor thermal contractions induce stress between the conductors and the flanges and between the conductors and the wafer. One effect of these stresses is that the wafer may be tilted within its jig seat. Since the wafer is already snugly received therein, such tilting causes the wafer to be jammed or bound against the jig wall. The problem of the prior art was the lack of suitable means for applying a removal force against the jammed wafer to dislodge it from the jig without causing further tilt of the wafer and the mount during removal. Such tilting is undesirable because it causes the electrodes to be dragged against the jig cylinders and thereby damaged.

Figure 2:
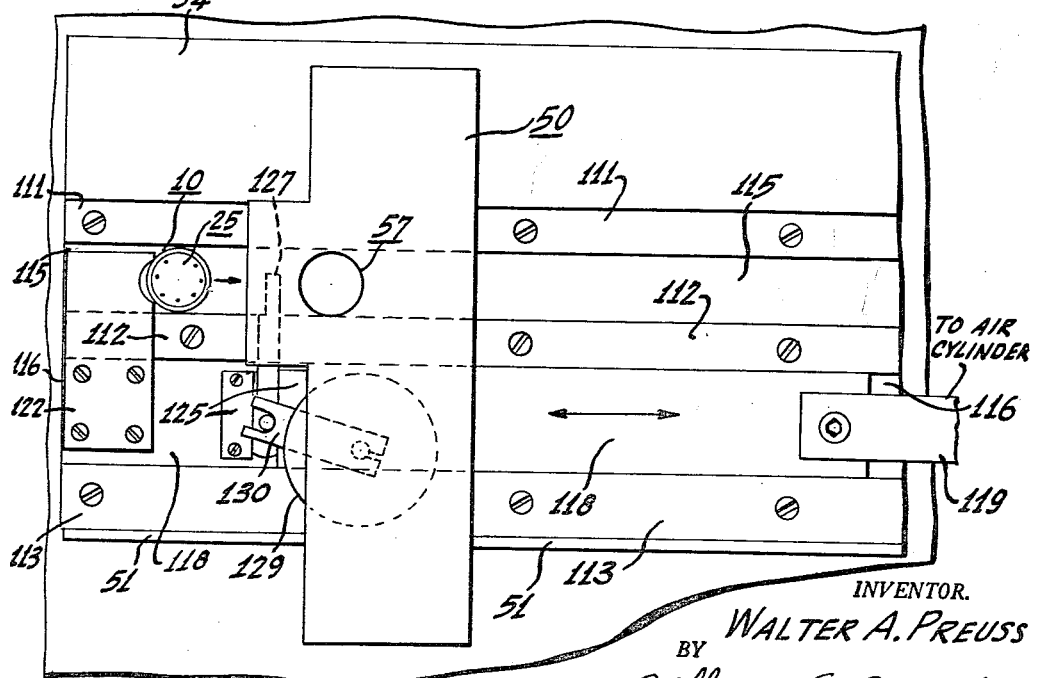
FIG. 2 is a side elevational view partially broken away of apparatus embodying this invention.

Apparatus according to this invention for removing a mount 25 from a brazing jig 10 is shown in FIGS. 2, 3 and 4. For receiving a loaded jig 10 containing a brazed mount 25, a housing 50 (FIGS. 2 and 3) is provided mounted on a plate 51 by means of a pair of parallel spaced apart blocks 52 (FIG. 2). Plate 51, in turn, is mounted on a table 54 by means of brackets, not shown. Within housing 50 a cavity or chamber 57 for receiving the jig 10 is provided having upper and lower tubular portions 58 and 59. Upper portion 58 has a smaller diameter than lower portion 59, the lower end of the wall of upper portion 58 providing an annular ledge or shoulder 60 at the top end of lower portion 59. Also, the diameter of upper portion 58 is larger than that of wafer 26 but less than that of jig 10. Upon full insertion of jig 10 into lower portion 59 (FIG. 4) by means to be described, the top end 22 of the jig 10 abuts against shoulder 60. Since wafer 26 is snugly received within the top end of jig 10, shoulder 60, the jig wall, and wafer 26 serve to substantially seal the lower chamber portion 59 containing the jig 10 from the upper portion 58. The diameter of lower portion 59 is such as to receive jig 10 therein in a relatively snug fit. An annular groove 62 is provided in the wall of lower portion 59 adjacent shoulder 60, groove 62 communicating through duct 64 and hose 65 to a source of pressurized air.

For inserting the loaded jig 10 into the lower portion 59 of chamber 57 and against shoulder 60, a plunger 70 (FIG. 2) is provided mounted on the end of a shaft 71, shaft 71 being slidably mounted within bearings 72 secured to table 54. For providing vertical movement to the shaft 71, an air cylinder (not shown) is provided, the piston of the air cylinder being coupled to the lower end of shaft 71. The stroke of the air cylinder piston is so arranged that when shaft 71 is raised, a brazing jig 10 resting on the top face 82 of plunger 70 is fully inserted into the chamber lower portion 59 and into engagement with shoulder 60 (FIG. 4). When shaft 71 is lowered (FIG. 2), plunger 70 is so located as to position the top face 82 thereof flush with the top surface of plate 51. An opening is provided in plunger face 82 which communicates with a bore 85 extending axially through plunger 70 and shaft 71. Bore 85 communicates in turn with a vacuum pump, not shown. The purpose of the vacuum within bore 85 will be described hereinafter. As shown in FIGS. 2 and 4, the peripheral edge 87 of plunger 70 is beveled. Upon full insertion of a jig 10 into the chamber portion 59, the plunger beveled edge 87 engages a sealing gasket 89 mounted within a groove 90 in the wall of lower portion 59. By these means the lower end of chamber 57 is sealed.

As will be described, the mount 25 is blown out of jig 10 and passes into and through the upper chamber portion 58. For receiving and holding the mount after it leaves chamber portion 58, a mount receiving mechanism 93 is provided mounted atop housing 50 by means of a bracket 94. Receiving mechanism 93 comprises a head 96 pivotally mounted on a pin 97 secured to bracket 94. A spring 98 is provided for pivoting head 96 clockwise as viewed in FIG. 2, and a latch arrangement 100 is provided for maintaining head 96 in vertical orientation. The latch arrangement includes a pivotally mounted latch arm 101 mounted on bracket 94 and a rod 102 secured to head 96. Arm 101 may be raised by means to be described thereby unlatching rod 102 and permitting rotation of head 96.

Slidably mounted within a bore 103 within head 96 is a tubular shaft 104. The top end of shaft 104 is secured to a rod 105 which extends outwardly of head 96, apertures being provided through the top end of shaft 104 permitting communication between the inside of shaft 104 and bore 103. Bore 103, in turn, communicates with a continuously working vacuum pump through flexible hose 106. Rod 105 is provided with a pair of nuts 107 threaded thereon, nuts 107 resting against head 96 and controlling the length of tubular shaft 104 extending downwardly from head 96. Secured at the lower end of shaft 104 is a tubular port member 108 of soft yieldable material, preferably rubber. The inner diameter of port member 108 is less than that of the wafer 26 of the mount 25 and the combination of shaft 104 and port member 108 is of relatively small mass for reasons to be described. The operation of receiving mechanism 93 will also be described hereinafter.

Further apparatus means are provided for positioning a loaded brazing jig 10 on the face 82 of plunger 70 and for later removing the empty jig therefrom. Plate 51 (FIG. 3) has mounted thereon three parallel slide gibs 111, 112, and 113 defining two parallel tracks 115 and 116. Track 115 leads directly under and beyond chamber 57 through housing 50. Track 116 slidably receives therein a slide 118. Slide 118 is actuated by an air cylinder, not shown, the piston 119 thereof being fastened to the end of slide 118. Mounted on the other end of slide 118 is an arm 122 which extends transversely thereof over slide gib 112 and track 115. Arm 122 is adapted to engage a jig 10 within track 115 and move it therealong towards housing 50. Also mounted on slide 118 for movement therewith are two other slide gibs 125 guiding a second arm of slide 127 therebetween. Slide 127 is reciprocally actuated by a rotary solenoid 129 mounted on slide 118, the armature of solenoid 129 being coupled to slide 127 by means of link 130. In its extended position, slide 127 extends over track 115 to engage a brazing jig therein.

Having described the apparatus, the operation thereof will now be described. With slide 118 in the position shown in FIGS. 2 and 3, that is, fully extended to the left of these figures, and the face 82 of plunger 70 positioned flush with the top surface of plate 51, a brazing jig 10 containing a brazed mount assembly 25 is placed within track 115 to the left of housing 50 and in engagement with arm 122. The slide 118 actuating air cylinder is energized and slide 118 is moved so as to slide jig 10 along track 115 and onto the face 82 of plunger 70. The bottom of jig 10 closes the opening in the face 82 of plunger 70, whereby the air within bore 85 of plunger 70 and shaft 71 is evacuated by the vacuum pump. In this manner, the jig is maintained firmly against the face 82 of plunger 70 by atmospheric pressure to prevent movement of the jig during insertion of the jig into chamber 57. The piston 119 is then actuated to return slide 118 to its original position, slide 127 (FIG. 3) being in retracted position within slide gibs 125 at this time to permit passage of slide 127 past the jig 10 on plunger 70.

Shaft 71 is then raised by the air cylinder coupled thereto to insert jig 10 through the underside of chamber 57 into the lower portion 59 and into engagement with shoulder 60 (FIG. 4). As mentioned, upon insertion of jig into chamber 57 and engagement of the jig with shoulder 60 and beveled edge 87 of plunger 70 with gasket 89, the lower portion 59 of chamber 57 containing the jig is sealed. Pressurized air is then admitted into chamber portion 59 through groove 62 from hose 65 and thence into jig 10 through its slots 21. The air pressure within the jig increases until the force against the wafer is sufficient to dislodge the wafer from the jig wall and to blow the mount out of the jig into and through upper chamber portion 58.

An important feature of this invention is that the mount is removed from the jig without excessive tilting thereof by the removal means. The air exerts a uniform pressure over the entire face of hte wafer, hence there are no unsymmetrical forces against the wafer tending to tilt the mount during its removal. It is noted that the pressurized air exerts a force against the wafer normal to the surface thereof. Thus, if the wafer is tilted with respect to the jig axis, the extraction force exerted by the air will tend to lift the mount out of the jig along a path normal to the wafer rather than along the jig axis. It has been found, however, that the amount of tilt of the wafer is never so great that the path normal to it is so far removed from the jig axis as to cause serious dragging of the electrodes against the jigging cylinders. The problem of the prior art mechanical removal means, which this invention solves, was the inability of the removal means to exert forces against the wafer which were perfectly uniform and symmetrical with respect thereto so as to prevent tilting of the wafer and the mount by the removal means.

The air source supplies air at a pressure in excess of what is required to dislodge the most tightly jammed wafer from its jig. Greater force than is required, however, is never exerted against the wafer since as soon as the wafer is dislodged from the jig and starts to lift therefrom, the seal of lower portion 59 is broken whereby the pressure within the jig is immediately relieved.

The mount is literally exploded from the jig by the air pressure, and to prevent excessive jarring of the mount and distortion of the electrodes, the mount is gently stopped, that is, decelerated over a relatively long time interval. To accomplish this in accordance with another feature of this invention, the receiving mechanism 93 shown in FIG. 2 is provided. Tubular port member 108 has an inner diameter less than the diameter of wafer 26, as mentioned, and when the mount 25 is blown from its jig 10, the leads 41 and 43 are inserted into the port member while the radially outermost portions of the wafer 26 engage the wall of port member 108. Because of the small mass of the shaft 104 and port member 108, and the slidable mounting of shaft 104 within head 96, the tubular shaft 104 recoils upon impact of mount 25 therewith, thereby avoiding sudden stoppage and jarring of the mount and providing immediate capture of the mount. That is, because of the recoil of tubular shaft 104 upon impact therewith of mount 25, the mount does not bounce away from port member 108 but remains in contact with it long enough to seal the end of the port member and permit evacuation of the air within bore 103 of head 96 and within tubular shaft 104. Mount 25 is thereafter held against port member 108 and tubular shaft 104 maintained inserted within head 96 by atmospheric pressure. The small mass of tubular shaft 104 and port member 108 has little stoppage effect on the moving mount initially, but the friction of tubular shaft 104 against the inside wall of head 96 eventually decelerates tubular shaft 104 and mount 25 to a stop. Also, the air within the head 96, before it is all evacuated, serves as a cushion for absorbing the shock of impact of the mount against tubular shaft 104 and for providing gentle mount deceleration.

A further feature of the receiving mechanism 93 is that after mount 25 is brought to rest it is removed from the immediate vicinity of housing 50 in order to facilitate its removal from the apparatus.

Upon impact of the mount 25 with port member 108 and recoil of tubular shaft 104 into head 96, the top end of rod 105 secured to tubular shaft 104 abuts against and raises arm 101 of the latch arrangement 100. This unlatches the rod 102 secured to head 96 whereby the head 96 is pivoted by spring 98. The rotation of head 96 lifts shaft 104 and the mount secured thereto away from housing 50 and "presents" the mount to an operator stationed to the left of the apparatus as viewed in FIG. 2. Upon removal of the mount 25 from port member 104 by the operator, the seal at the port member 108 is broken permitting tubular shaft 104 to return to its original position when head 96 is rotated back and relatched to latch arm 101.

Shaft 71 is then lowered to remove the empty jig from within housing 50, a new loaded brazing jig 10 is placed in track 115, and the slide 118 is again energized to slide the new jig forward onto plunger 70. At this time, rotary solenoid 129 is actuated to advance slide 127 over track 115 whereby upon movement of slide 118 to advance the new jig, slide 127 pushes the empty jig 10 off plunger 70. The empty jigs 10 are thus forced along track 115 towards a collector tray (not shown) to the right of FIG. 3. A feeler mechanism, not shown, may be provided along track 115 to feel the upwardly extending conductors of any mounts that have not been removed from their jigs. The jigs containing unremoved mounts pass into the collector tray, and a trap door arrangement may also be provided through which the empty jigs drop.

What is claimed is:

1. Apparatus for removing an electron tube mount from a jig, said apparatus including means having a chamber adapted to receive a jig therein, means for inserting said jig into said chamber, means for blowing a mount in said jig from said jig and said chamber, and means adjacent said chamber for receiving said mount, said last-named means including a housing and a tubular shaft slidably mounted in said housing, one end of said shaft being disposed adjacent said chamber, and said one end including a yieldable tubular means for receiving a mount blown from said chamber.

2. Apparatus for removing an electron tube mount from a jig, said apparatus including means having a chamber adapted to receive a jig therein, means for inserting said jig into said chamber through one end thereof, means for sealing said chamber, means for blowing air into said jig, whereby a mount in said jig is blown from said jig and said chamber, and means adjacent the other end of said chamber for receiving said mount, said last-named means including a housing and a tubular shaft slidably mounted in said housing, one end of said shaft being disposed adjacent said chamber, and said one end including a yieldable tubular means for receiving a mount blown from said chamber.

3. Apparatus for removing an electron tube mount having a wafer from a cup-shaped jig having an aperture in the wall thereof, said apparatus including means forming a tubular chamber adapted to receive a jig therein, means for inserting said jig into said chamber through one end thereof, means for sealing said chamber, means for blowing air into said chamber and through said aperture into said jig, whereby a mount in said jig is blown from said jig and said chamber, and means adjacent the other end of said chamber for capturing said mount in a preselected orientation and for gently decelerating said mount, said last-named means including a housing and a tubular shaft slidably mounted in said housing, one end of said shaft being disposed adjacent said chamber, and said one end including a yieldable tubular member having an inside diameter of a size to snugly engage a portion of said mount blown inwardly of said tubular member from said chamber.

4. Apparatus for removing an electron tube mount having a wafer from a cup-shaped jig having an aperture in the wall thereof, said mount being disposed within said jig such that said wafer substantially closes the open end of said jig, said apparatus including means having a tubular chamber adapted to receive a jig therein, means for inserting said jig into said chamber through one end thereof, means for sealing said chamber, said wafer serving as a portion of said sealing means, means for blowing air into said chamber and through said aperture into said jig, whereby a mount in said jig is blown from said jig and said chamber, and means adjacent the other end of said chamber for receiving said mount, said receiving means being yieldingly mounted permitting recoil thereof for absorbing the impact of said mount with said receiving means, said last-named means including a housing and a tubular shaft slidably mounted in said housing, one end of said shaft being disposed adjacent said chamber, and said one end including a yieldable tubular means for receiving a mount blown from said chamber.

5. Apparatus for removing an electron tube mount from a jig including means having a chamber adapted to receive said jig therein, means for inserting said jig into said chamber, said inserting means including means for sealing one end of said chamber, means for sealing a portion of said chamber containing said jig from another portion of said chamber, means for blowing air into said jig whereby a mount in said jig is blown from said jig into and through the other of said chamber portions, and means adjacent the end of said other chamber portion for receiving said mount, said last-named means including a housing and a tubular shaft slidably mounted in said housing, one end of said shaft being disposed adjacent said chamber, and said one end including a yieldable tubular member having an inside diameter of a size to snugly engage a portion of said mount blown inwardly of said tubular member from said chamber.

6. Apparatus for removing an electron tube mount having a disk-like wafer from a jig including means having a chamber adapted to receive said jig therein, means for inserting said jig into said chamber, means for sealing a portion of said chamber containing said jig from another portion of said chamber, said wafer forming part of said sealing means, means for blowing air into said jig receiving portion of said chamber and into said jig whereby a mount in said jig is blown from said jig into and through the other of said chamber portions, and means extending into said other chamber portion for receiving said mount in preselected orientation.

7. Apparatus for removing an electron tube mount having a wafer from a cup-shaped jig having an open end and an aperture in the wall thereof, said mount being disposed within said jig such that said wafer substantially closes the open end of said jig, said apparatus including means having a chamber adapted to receive said jig therein, means for inserting said jig into said chamber, means for sealing a portion of said chamber containing said jig from another portion of said chamber, said wafer forming part of said sealing means, means for blowing air into said jig containing portion of said chamber and through said aperture into said jig, whereby a mount in said jig is blown from said jig into and through the other of said chamber portions and means extending into said other chamber portion for receiving said mount in preselected orientation.

8. Apparatus for extracting an electron tube mount from an assembly jig, said jig being cup-shaped and having an open end and an aperture in the wall thereof, and said mount having a flat wafer at one end thereof substantially closing the open end of said jig, said apparatus including means having an elongated chamber having upper and lower sections, and a radially inwardly extending ledge at the top end of said lower section, means for inserting said jig into said lower section and into engagement with said ledge whereby said sections are substantially sealed from each other, means for closing the lower end of said chamber, means for blowing air into said lower section and through said aperture into said jig whereby a mount in said jig is blown out of said jig into and through said upper section, and means extending into the upper end of said chamber for receiving said mount in preselected orientation.

9. Apparatus for extracting an electron tube mount from an assembly jig, said jig being cup-shaped and having an opening through the wall thereof, said mount having a flat wafer at one end thereof substantially closing the top open end of said jig, said apparatus including means having an elongated open-ended chamber having upper and lower sections, the cross section of said upper section being greater than that of said wafer but less than that of said jig, the cross section of said lower section being greater than that of said jig, and the lower end of the wall of said upper section providing an annular shoulder at the top end of said lower section, means for inserting said jig into said lower section and into enagement with said shoulder for sealing said sections from each other, said inserting means including means for closing the lower end of said chamber, means for blowing air into said lower section and through said opening into said jig whereby a mount in said jig is blown out of said jig into and through said upper section, and means adjacent the upper end of said chamber for receiving said mount, said receiving means being mounted for recoil upon impact by said mount for gently decelerating said mount.

10. Apparatus for extracting an electron tube mount from an assembly jig, said jig being cup-shaped and having an open end and an aperture in the wall thereof, and said mount having a flat wafer at one end thereof substantially closing the open end of said jig, said apparatus including means having an elongated open-ended chamber having upper and lower sections, the cross section of said upper section being greater than that of said wafer but less than that of said jig, the cross section of said lower section being greater than that of said jig, and the lower end of the wall of said upper section providing an annular shoulder at the top end of said lower section, means for inserting said jig into said lower section and into engagement with said shoulder for sealing said sections from each other, means for closing the lower end of said chamber, means for blowing air into said lower section and through said aperture into said jig whereby a mount in said jig is blown out of said jig into and through said upper section, and means adjacent the upper end of said chamber for receiving said mount, said receiving means being yieldingly mounted permitting recoil thereof for absorbing the shock of impact of said mount with said receiving means for preventing damage to said mount.

11. Apparatus for extracting an electron tube mount from an assembly jig including means having an elongated chamber having upper and lower sections, a radially inwardly directed annular shoulder at the top end of said lower section, means for inserting said jig into said lower section and into engagement with said shoulder for sealing said sections from each other, means for closing the lower end of said chamber, means for blowing air into said jig whereby a mount in said jig is blown out of said jig into and through said upper section, and means adjacent the upper end of said chamber for receiving said mount, said receiving means being yieldingly mounted permitting recoil thereof upon impact of said mount with said receiving means for absorbing the shock of impact of said mount for preventing damage to said mount.

12. Apparatus for extracting an electron tube mount having a flat wafer from an assembly jig, said jig being cup-shaped and having an open end and an aperture in the wall thereof, said mount being disposed within said jig such that said wafer substantially closes the open end of said jig, said apparatus including means having an elongated open-ended chamber adapted to receive an assembly jig through the lower end thereof, said chamber having a shoulder intermediate the ends thereof dividing said chamber into upper and lower portions, plunger means for receiving an assembly jig on the face thereof and for inserting said jig into said lower portion and into contact with said shoulder for sealing said portions from each other, means for sealing the lower end of said chamber, means for blowing air into said lower portion and through said aperture into said jig whereby a mount in said jig is blown from said jig into and through said upper portion, and a tubular member of soft yieldable material mounted adjacent the upper end of said chamber for receiving said mount, said tubular member being yieldingly mounted permitting recoil thereof upon impact of said mount therewith.

13. Apparatus for extracting an electron tube mount having a flat wafer from an assembly jig, said jig being cup-shaped and having an opening through the wall thereof, said mount being disposed within said jig such that said wafer substantially closes the top open end of said jig, said apparatus including means having an elongated open-ended chamber adapted to receive an assembly jig through the lower end thereof, said chamber having a shoulder intermediate the ends thereof dividing said chamber into upper and lower portions, plunger means for receiving an assembly jig on the face thereof and for inserting said jig into said lower portion and into contact with said shoulder for sealing said portions from each other, said face having a source of vacuum connected therewith for maintaining said jig thereon during insertion, means for sealing the lower end of said chamber, means for blowing air into said jig whereby a mount in said jig is blown from said jig into and through said upper portion, and a tubular member of soft yieldable material mounted adjacent the upper end of said upper portion for receiving said mount, said tubular member being yieldingly mounted permitting recoil thereof upon impact of said mount therewith.

References Cited in the file of this patent

UNITED STATES PATENTS

| | | |
|---|---|---|
| 1,994,178 | Raiche | Mar. 12, 1935 |
| 2,098,582 | Melchert | June 2, 1941 |
| 2,254,208 | Brock | Sept. 2, 1941 |
| 2,512,597 | Axtell et al. | June 27, 1950 |